(12) United States Patent
Bedell et al.

(10) Patent No.: US 7,380,330 B2
(45) Date of Patent: Jun. 3, 2008

(54) METHOD FOR MAKING MAGNETIC WRITE HEAD

(75) Inventors: Daniel Wayne Bedell, Gilroy, CA (US); Aron Pentek, San Jose, CA (US); Katalin Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 397 days.

(21) Appl. No.: 11/186,174

(22) Filed: Jul. 21, 2005

(65) Prior Publication Data

US 2007/0017087 A1    Jan. 25, 2007

(51) Int. Cl.
*G11B 5/127* (2006.01)

(52) U.S. Cl. ............... 29/603.12; 29/603.07; 29/603.13; 29/603.15; 29/603.18

(58) Field of Classification Search ............ 29/603.12, 29/603.13, 603.15, 603.07, 603.18; 360/126, 360/417, 122, 120, 127; 204/192.34, 192.35
See application file for complete search history.

(56) References Cited

U.S. PATENT DOCUMENTS

| | | | | |
|---|---|---|---|---|
| 5,935,644 A | * | 8/1999 | Heim et al. | 427/116 |
| 6,074,566 A | * | 6/2000 | Hsiao et al. | 360/126 |
| 6,104,576 A | * | 8/2000 | Santini | 360/126 |
| 6,301,084 B1 | * | 10/2001 | Santini | 360/317 |
| 6,553,649 B1 | * | 4/2003 | Santini | 29/603.14 |
| 6,785,953 B2 | | 9/2004 | Santini | 29/603.14 |
| 2002/0191350 A1 | | 12/2002 | Santini | 360/317 |
| 2003/0169534 A1 | | 9/2003 | Santini | 360/126 |
| 2003/0223150 A1 | | 12/2003 | Lee | 360/126 |
| 2004/0070872 A1 | | 4/2004 | Hsu et al. | 360/126 |

* cited by examiner

*Primary Examiner*—A. Dexter Tugbang
*Assistant Examiner*—Tai Nguyen
(74) *Attorney, Agent, or Firm*—John L. Rogitz

(57) ABSTRACT

After defining the P2 pole of a magnetic read head, alumina is deposited over it and planarized by CMP, with the portion of the alumina overlaying the ABS region of the P2 pole subsequently being masked by a photoresist layer and with the portions of the alumina overlaying the flare area, back gap region, and center tap regions of the P2 pole not being masked. A reactive ion mill is performed to expose the flare area, back gap region, and center tap regions of the P2 pole by removing the alumina over these portions, so that subsequent steps such as forming a layer of coiled conductors, forming a return pole, and forming stud connections along with removing the respective seed layers can be executed with the ABS region protected by the alumina and with the flare area, back gap region, and center tap region exposed.

2 Claims, 2 Drawing Sheets

METHOD FOR MAKING MAGNETIC WRITE HEAD

I. FIELD OF THE INVENTION

The present invention generally relates to methods for making write heads for use in magnetic storage systems.

II. BACKGROUND

In magnetic disk drives, data is written and read by magnetic transducers called "heads." The magnetic disks are rotated at high speeds, producing a thin layer of air called an air bearing surface (ABS). The read and write heads are supported over the rotating disk by the ABS, where they either induce or detect flux on the magnetic disk, thereby either writing or reading data. Layered thin film structures are typically used in the manufacture of read and write heads. In write heads, thin film structures provide high areal density, which is the amount of data stored per unit of disk surface area, and in read heads they provide high resolution.

A thin film write head may have two pole pieces, namely, a top pole piece (colloquially referred to as "P2") and a bottom pole piece ("P1"). A write head generally has two regions, denoted a pole tip region and a back region. The pole pieces are formed from thin magnetic material films and in longitudinal recording heads converge in the pole tip region at a magnetic recording gap, and in the back region at a back gap. In a perpendicular recording write heads, on the other hand, no write gap exists. Instead, the second pole piece P2 is formed with a pole tip that has a width which defines the track width of the write head and a wider yoke portion which delivers the flux to the pole tip. At a recessed end of the pole tip the yoke flares laterally outwardly at a "flare area" to its full width and thence, as in the case of longitudinal recording heads, to a back gap that is magnetically connected to a back gap of a first pole piece.

In any case, a write head thus has at least one pole tip "P2". The width of the P2 pole at the ABS predominantly defines the write track width of the write head. The height "P2T" of the P2 pole plays a role in determining the amount of flux delivered to the disk, making it an important feature. The write track width, which is related to the width of the bottom of the P2 pole, is especially important because it limits the areal density of a magnetic disk. A narrower track width translates to greater tracks per inch (TPI) written on the disk, which in turn translates to greater areal density.

In the present assignee's co-pending U.S. patent application published as 2005/0023243 and incorporated herein by reference, a process for making a write head is disclosed which includes forming the P2 pole, followed by chemical-mechanical polishing (CMP)-assisted reactive ion (Argon) milling. The reactive ion milling is used for high selectivity to remove only areas desired to be removed for subsequent process steps. As recognized herein, however, portions of the P2 pole undesirably can be removed during the subsequent process steps, requiring that a thicker P2 layer be deposited in the first place to compensate for this removal. As also understood herein, requiring a thicker initial P2 layer means that the as-plated aspect ratio of the P2 layer is relatively high, which is undesirable particularly for P2 poles defined by DUV lithography, because the aspect ratio is limited by the so-called "straight zone" in the trench. Having made these critical observations, the present invention understands that it is desirable to prevent unwanted thinning of certain portions of the P2 pole during post-pole formation steps, to facilitate depositing thinner P2 layers initially.

SUMMARY OF THE INVENTION

A process for manufacturing a magnetic write head includes forming a P2 pole structure, and covering the P2 pole structure with a dielectric layer which can undergo CMP if desired for planarization. The method further includes masking a portion of the dielectric layer overlaying an air bearing surface (ABS) region of the P2 pole structure while leaving exposed portions overlaying a flare area of the P2 pole structure, a back gap region of the P2 pole structure, and a center tap region of the P2 pole structure. The exposed portions of the dielectric layer but not the portion of the dielectric layer overlaying the air bearing surface region of the P2 pole structure are removed, after which further processing steps may be executed with the air bearing surface region of the P2 pole structure protected by the dielectric layer.

The process applies particularly to stitched pole processes.

The dielectric layer may be alumina, and the exposed portions of the dielectric layer can be removed using reactive ion milling. The exposed portions may be removed immediately after masking, i.e., prior to any intervening acts being performed. Then, in exemplary implementations the process can include forming a layer of coiled conductors and then removing a respective seed layer, and/or forming a return pole and removing a respective seed layer, and/or forming stud connections and removing a respective seed layer.

In another aspect, a method for making a magnetic recording head includes establishing a P2 pole structure having at least an ABS region, a flare area, a back gap region, and a center tap region. Using at least a photoresist mask in cooperation with a reactive ion process, a dielectric protective layer is established over the ABS region but not over the flare area, back gap region, and center tap region. One or more additional steps are then executed with the ABS region protected by the protective layer and with the flare area, back gap region, and center tap region exposed.

In still another aspect, a method for making a recording head includes, with an ABS region of a P2 pole protected by alumina and with a flare area, back gap region, and center tap region of the P2 pole exposed by means of cooperation between alumina deposition followed by CMP, photoresist masking, and reactive ion milling, executing at least one additional step. The step is selected from the group consisting of (1) forming a layer of coiled conductors and then removing a respective seed layer; (2) forming a return pole and removing a respective seed layer; and (3) forming stud connections and removing a respective seed layer.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
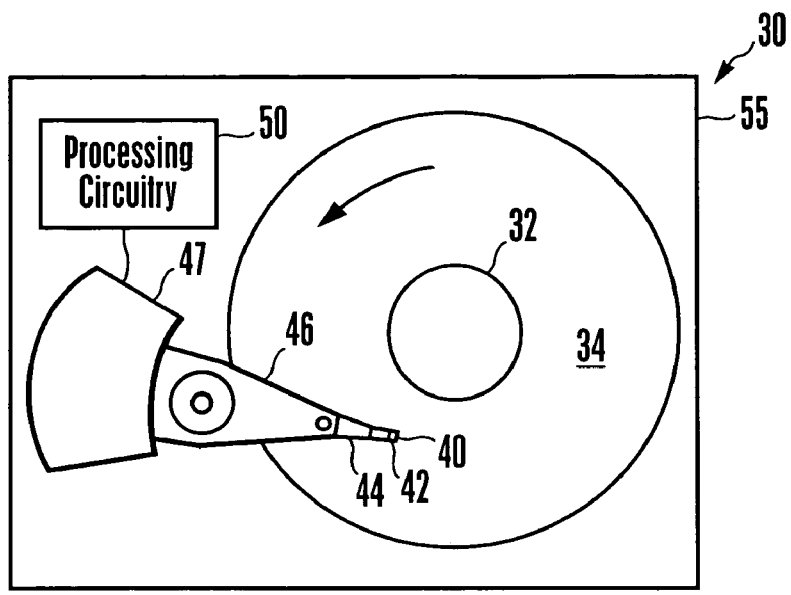
FIG. 1 is a schematic plan view of a hard disk drive, showing one non-limiting environment for the present invention.

Referring initially to FIG. 1, a magnetic disk drive 30 includes a spindle 32 that supports and rotates a magnetic disk 34. The spindle 32 is rotated by a spindle motor that is controlled by a motor controller which may be implemented in the electronics of the drive. A slider 42 has a combined read and write magnetic head 40 and is supported by a suspension 44 and actuator arm 46 that is rotatably positioned by an actuator 47. The head 40 may be a GMR or MR head. It is to be understood that a plurality of disks, sliders and suspensions may be employed. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin cushion of air known as the air bearing that exists between the surface of the disk 34 and an air bearing surface (ABS) of the head. The magnetic head 40 may then be employed for writing information to multiple circular tracks on the surface of the disk 34, as well as for reading information therefrom. To this end, processing circuitry 50 exchanges signals, representing such information, with the head 40, provides spindle motor drive signals for rotating the magnetic disk 34, and provides control signals to the actuator for moving the slider to various tracks. The components described above may be mounted on a housing 55.

Figure 2:
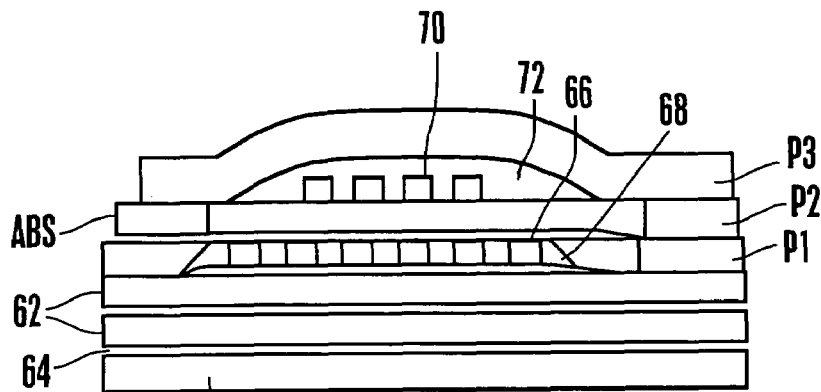
FIG. 2 is an elevational view of a non-limiting write head made in accordance with the present invention.

Now referring to FIG. 2, the head 40 which is manufactured using the process of the present invention includes first and second pole pieces denoted P1 and P2, respectively. A return pole piece P3 may be on the second pole piece P2, with the second pole piece P2 thus being disposed between the first and return pole pieces P1, P3. The pole pieces may establish a horseshoe magnet. In some embodiments, the first pole piece P1 may be associated with a pedestal P1P, e.g., the pedestal P1P may be between the first pole P1 proper and the second pole piece P2 as shown.

The second pole piece P2 defines, at one end surface (the left one in FIG. 2), an air bearing surface, labeled "ABS". The pole pieces shown in FIG. 2 are supported by a substrate 60, and one or more magnetic shields 62 may be disposed between the substrate 60 and pole pieces as shown in accordance with principles known in the art, e.g., by using plating techniques. Insulation layers 64 may be provided between the shields 62 and between the bottom shield 62 and substrate 60 as shown, also in accordance with principles known in the art.

FIG. 2 also shows that between front and back regions of the first pole piece P1, a first layer of coiled conductors 66 may be disposed within a first coil insulation layer 68 that may be, e.g., hard baked resist. The first pole piece pedestal P1P straddles the conductors 66 as shown. Also, on top of the second pole piece P2 and between front and back regions of the return pole piece P3, a second layer of coiled conductors 70 may be disposed within a second coil insulation layer 72. Studs that are made of highly permeable material may be used to provide low reluctance coupling of a trailing shield to the pole P1 if desired in accordance with the present assignee's USPP 2005/0024766, incorporated herein by reference.

An embodiment of the method by which the head 40 shown in FIGS. 1 and 2 can be made is shown in FIGS. 3-7. It is to be understood that the process flow of FIG. 3 commences after initial steps have been executed. At block 78, the second pole piece P2 is formed by, e.g., suitable plating methods, with pole piece features defined, if desired, using DUV lithography. Thin film photolithography plating can be used if desired. Those skilled in the art will appreciate that photolithography is exemplary only and that alternative deposition methods are contemplated as being within the scope of the present invention. These can include electroplating, cathodic sputtering, ion beam deposition, and the like.

After the second pole piece P2 has been defined and preferably before any other process steps are performed, the process moves to block 80, wherein a layer 82 (FIG. 4) of dielectric is deposited by, e.g., sputtering or vapor deposition on the pole piece P2. In one embodiment the layer 82 is alumina ($Al_2O_3$), and the alumina layer 82 is deposited over an air bearing surface region 84 of the pole piece P2 structure, as well as over flare area 85, back gap 86, and center tap 88 regions of the pole piece P2. As is known in the art, the pole pieces P1 and P2 converge at the back gap region 86, such that they are not separated by a gap in this region. It is to be understood that while the illustrative embodiment discussed herein uses alumina which is subsequently removed by reactive ion milling, silicon dioxide alternatively may be used for the dielectric layer 82, in which case the reactive ion milling process discussed below may be replaced by a reactive ion etching process which may be Fluorine-based.

Figure 3:
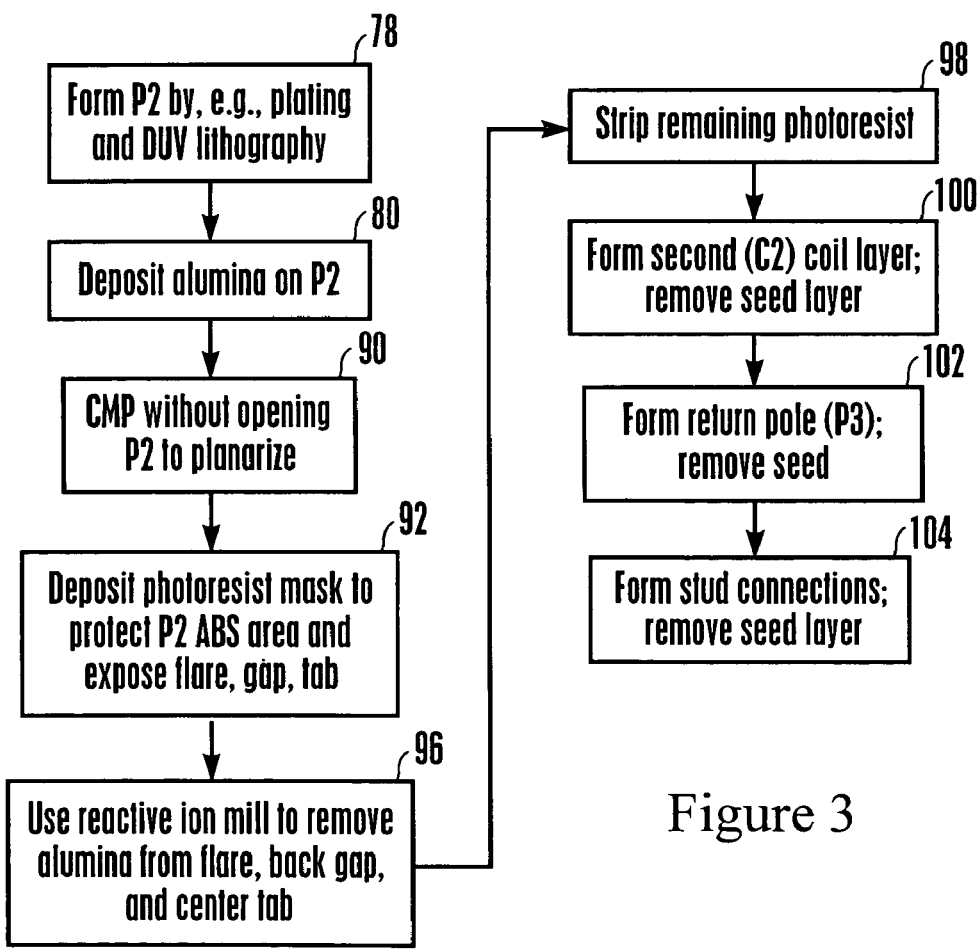
FIG. 3 is a flow chart showing the steps of the present invention.
Figure 4:
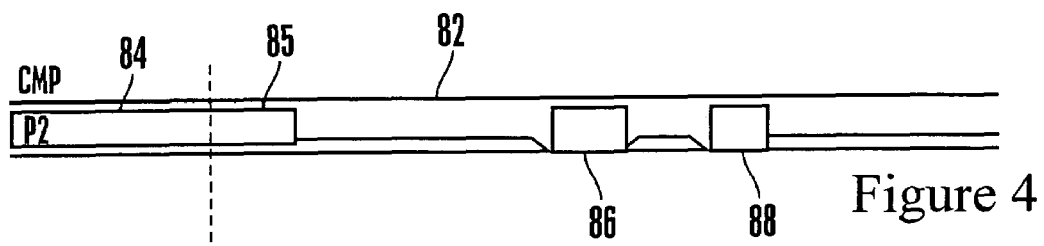
FIGS. 4-7 are schematic elevational views showing the head at various steps of FIG. 3.

Moving to block 90 of FIG. 3, the alumina layer 82 is subjected to CMP to remove topography and to planarize the structure as shown in FIG. 4. The CMP step does not completely remove the alumina layer 82, however, but rather leaves a layer 82 having a thickness from about fifteen hundredths of a micrometer to about two tenths of a micrometer.

Figure 5:
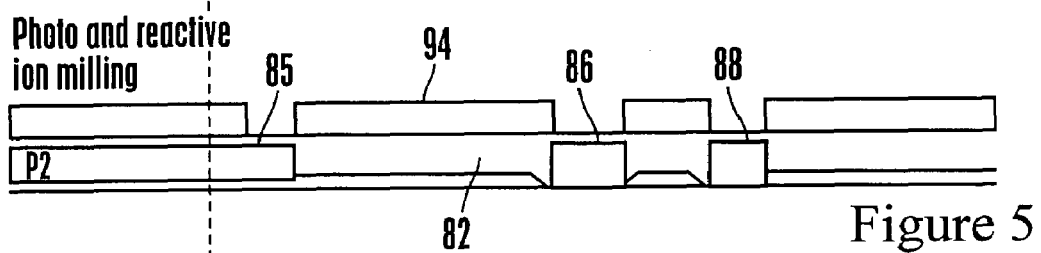
Figure 6:
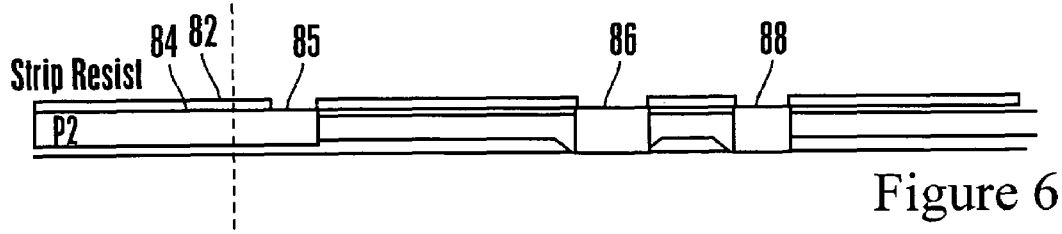
Figure 7:
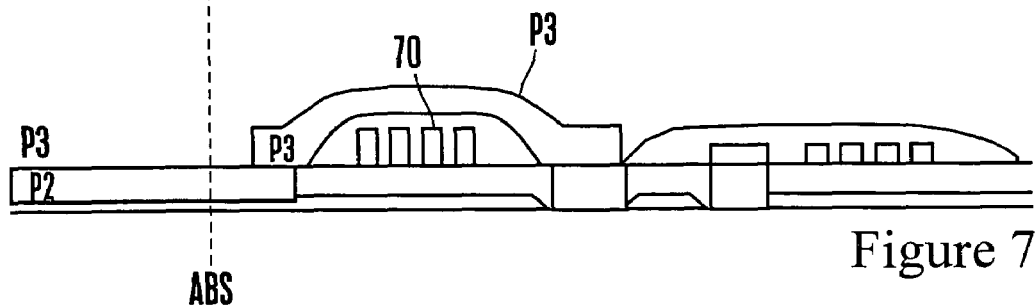

At block 92 of FIG. 3 and as shown in FIG. 5, preferably prior to other steps being executed after block 90 a photoresist mask 94 is deposited onto the layer 82 and is photopatterned in accordance with principles known in the art to leave exposed the portions of the dielectric layer 82 that overlay the flare area 85, back gap 86, and center tap 88 regions of the pole piece P2. Then, with the remaining portions of the mask in place, a reactive ion mill is performed at block 96 to remove the portions of the alumina layer 82 that overlay the flare area 85, back gap 86, and center tap 88 regions. The reactive ion mill may use, e.g., $CHF_3$. The remaining portions of the mask 94 are stripped away using principles known in the art at block 98, resulting in the structure shown in FIG. 6 in which the ABS portion 84 is covered by alumina and hence protected but in which no alumina layer 82 overlays the flare area 85, back gap 86, and center tap 88 regions, exposing these regions.

With the ABS region 84 of the pole piece P2 protected and with the flare area 85, back gap 86, and center tap 88 regions exposed, the process moves to block 100 to form the second layer of coiled conductors 70 and then to remove the respective seed layer in accordance with principles known in the art. At block 102 the return pole P3 is established and the respective seed layer removed and then at block 104 the stud connections are established, followed by removing the respective seed layer, all the while with the ABS region 84 of P2 being advantageously protected by the alumina layer 82 but with the flare area 85, back gap 86, and center tap 88 regions of P2 exposed owing to the above-described method.

In non-limiting embodiments the magnetic head assembly discussed above may be a merged head or a piggyback head. The pole pieces may be ferromagnetic materials which may be nickel iron. The second pole piece P2 may be a different ferromagnetic material than other pole structures, e.g., the second pole piece P2 may be $Ni_{45}Fe_{55}$ while other pole structure (e.g., a pole tip) may be $Co_{90}Fe_{10}$.

While the particular METHOD FOR MAKING MAGNETIC WRITE HEAD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for making a magnetic recording head, comprising:

establishing a P2 pole structure having at least an ABS region, a flare area, a back gap region, and a center tap region;

using at least a photoresist mask in cooperation with a reactive ion process, establishing a dielectric protective layer over the ABS region but not over the flare area, back gap region, and center tap region;

executing at least one additional step in the method with the ABS region protected by the protective layer and with the flare area, back gap region, and center tap region exposed; and with the ABS region protected by the alumina and with the flare area, back gap region, and center tap region exposed, forming a return pole P3 and removing a respective seed layer.

2. A method for making a magnetic recording head, comprising:

establishing a P2 pole structure having at least an ABS region, a flare area, a back gap region, and a center tap region;

using at least a photoresist mask in cooperation with a reactive ion process, establishing a dielectric protective layer over the ABS region but not over the flare area, back gap region, and center tap region;

executing at least one additional step in the method with the ABS region protected by the protective layer and with the flare area, back gap region, and center rap region exposed; and with the ABS region protected by the alumina and with the flare area, back gap region, and center tap region exposed, fanning stud connections and removing a respective seed layer.

* * * * *